United States Patent
Murtagh (10) Patent No.: US 8,723,887 B2
(45) Date of Patent: *May 13, 2014

(54) METHODS AND SYSTEMS FOR PER PIXEL ALPHA-BLENDING OF A PARENT WINDOW AND A PORTION OF A BACKGROUND IMAGE

(71) Applicant: Citrix Systems, Inc., Fort Lauderdale, FL (US)

(72) Inventor: Rick Murtagh, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,222

(22) Filed: Feb. 26, 2013

(65) Prior Publication Data

US 2013/0169676 A1 Jul. 4, 2013

Related U.S. Application Data (63) Continuation of application No. 12/556,540, filed on Sep. 9, 2009, now Pat. No. 8,405,679.

(60) Provisional application No. 61/095,610, filed on Sep. 9, 2008.

(51) Int. Cl.
*G09G 5/00* (2006.01)

(52) U.S. Cl.
USPC .............................. 345/629; 345/581; 345/619

(58) Field of Classification Search
None
See application file for complete search history.

(56) References Cited

U.S. PATENT DOCUMENTS

| | | |
|---|---|---|
| 2002/0118891 A1 | 8/2002 | Rudd et al. |
| 2002/0171682 A1 | 11/2002 | Frank et al. |
| 2002/0186351 A1 | 12/2002 | Gnanamgari et al. |
| 2003/0020712 A1 | 1/2003 | Wada |
| 2003/0063797 A1 | 4/2003 | Mao |
| 2004/0001544 A1* | 1/2004 | Mehrotra ............... 375/240.1 |
| 2007/0015118 A1 | 1/2007 | Nickell et al. |
| 2008/0143737 A1 | 6/2008 | Weybrew et al. |
| 2008/0215995 A1 | 9/2008 | Wolf |
| 2008/0246777 A1 | 10/2008 | Swanson et al. |
| 2009/0217198 A1 | 8/2009 | Jung |

FOREIGN PATENT DOCUMENTS

EP 0 344 082 4/1989

OTHER PUBLICATIONS

International Preliminary Report on Patentability on PCT/US2009/056416 dated Mar. 24, 2011.
International Search Report on PCT/US2009/056416 dated Dec. 7, 2009.
Notice of Allowance on U.S. Appl. No. 12/556,540 dated Nov. 27, 2012.
Office Action on U.S. Appl. No. 12/556,540 dated Jun. 28, 2012.
Written Opinion on PCT/US2009/056416 dated Dec. 7, 2009.

* cited by examiner

*Primary Examiner* — Jwalant Amin
(74) *Attorney, Agent, or Firm* — Foley and Lardner LLP; John D. Lanza (57) ABSTRACT

A system for alpha blending at least a portion of an image of a window with a background image, where the image of the window is captured by an alpha blender and blended together with an image of the background also captured by the alpha blender. The resulting alpha-blended image is then displayed within the window to give at least a portion of the window the appearance of smooth, anti-aliased edges.

18 Claims, 8 Drawing Sheets

METHODS AND SYSTEMS FOR PER PIXEL ALPHA-BLENDING OF A PARENT WINDOW AND A PORTION OF A BACKGROUND IMAGE

RELATED APPLICATIONS

This U.S. patent application is a continuation of U.S. patent application Ser. No. 12/556,540, titled "Methods and Systems for Per Pixel Alpha-Blending of a Parent Window and a Portion of a Background Image," filed on Sep. 9, 2009, which claims priority to U.S. Provisional Patent Application Ser. No. 61/095,610, filed on Sep. 9, 2008, the disclosure of which is considered part of the disclosure of this application and is herein incorporated by reference in its entirety.

FIELD OF THE DISCLOSURE

This application generally relates to methods and systems for alpha-blending images. In particular, this application relates to methods and systems for alpha-blending a window and a portion of a background image.

BACKGROUND OF THE DISCLOSURE

Newer operating systems often times feature transparent window borders and in some cases transparent windows. Window transparency can often interfere with alpha-blending because of the difficulties posed by trying to alpha-blend an image to the desktop. In fact, most alpha-blending techniques do not interact with the desktop or other windows, but rather alpha blend two images. Therefore it can be difficult to anti-alias the corners of windows so that they appear smooth when contrasted against a background or other windows.

SUMMARY OF THE DISCLOSURE

This disclosure describes methods and systems for alpha-blending a window to a background image that can comprise any of the following: a desktop; one or more additional windows; an image; or any other object. Alpha-blending techniques typically cannot be used to alpha-blend one window to another window. Furthermore, alpha-blending techniques typically cannot be used to alpha-blend one window to a desktop. The methods and systems described herein address these deficiencies by providing methods and systems for alpha blending at least portions of a window to a background image which can contain an image of a desktop or an image of a window.

In one aspect, described herein, is an embodiment of a method for alpha-blending sections of a window with sections of a background region. A window manager executing on a computing machine, obtains the coordinates of a window located over a background region. An alpha-blender executing on the computing machine captures the window overlapping at least a portion of the captured background region image, and then alpha-blends the image of the window with a section of the background region image to generate a third image. A rendering agent executing on the computing machine then displays the third image within the window.

In one embodiment, the alpha blender can capture an image of the background region, where the size of the image is derived from the obtained window coordinates.

In other embodiments, the alpha-blender captures an image of the background region where the window wholly overlaps the background region image.

In one embodiments, the alpha-blender captures an image of the window, while in other embodiments the alpha-blender captures the image of a background region comprising a desktop, and/or the alpha-blender captures an image of a background region comprising at least a second window.

The alpha-blender, in some embodiments, captures an image of the background region where the background region image has a size and a location determined using the obtained window coordinates. In still other embodiments, the alpha-blender alpha-blends an image of a portion of the window.

In one embodiment, the alpha-blender determines a first pixel in the window image that includes a first alpha channel value, and a second pixel in the section of the background image that includes a second alpha channel value where the first alpha channel value is different than the second alpha channel value. The alpha-blender then selects one of the first alpha channel value and the second alpha channel value and includes the selected alpha channel value in the generated third image.

The rendering agent, in some embodiments, displays the third image within a background of the window.

In another aspect, described herein is a system for alpha-blending sections of a window with sections of a background region. Included in the system is a computing machine comprising a processor and memory, and a window manager executing on a computing machine to obtain coordinates of a window located over a background region. Also included in the system is an alpha-blender executing on the computing machine to capture an image of the background region, the window overlapping at least a portion of the captured background region image, and alpha-blend an image of the window with a section of the background region image to generate a third image. Still further included is a rendering agent executing on the computing machine to display the third image within the window.

BRIEF DESCRIPTION OF THE DRAWINGS

The following figures depict certain illustrative embodiments of a method and system for per pixel alpha blending of a parent window to a desktop, where like reference numerals refer to like elements. Each depicted embodiment is illustrative of the method and system and not limiting.

DETAILED DESCRIPTION

In some environments involving graphics processing, two or more images may be merged together to produce a composite image. In one of these environments, a technique may be employed to create an appearance of partial transparency where some or all of one image is visually superimposed over a second image, while the occluded portion of the second image remains partially discernable in the composite image. One process for producing such a transparency effect is referred to as alpha-blending, or alpha-compositing.

In some embodiments, alpha-blending in the area of computer graphics typically involves an alpha-channel value ($\alpha$), ranging from 0 to 255. In one of the embodiments, a value of 0 represents full transparency whereas a value of 255 indicates complete opaqueness when applied to an image or a pixel. In other embodiments, taking a pixel of an bitmap image expressed in RGB triplets for example, where R, G and B represents the red, green and blues color intensities respectively, the pixel is typically represented as (R, G, B). An alpha-channel may be added to the pixel, so that the pixel is now represented as an RGBA quartet—(R, G, B, $\alpha$). In further embodiments, when a first pixel (R, G, B, $\alpha$) of a first image with an alpha-channel is "super-imposed over" a second pixel (r, g, b) of a second image without an alpha-channel, the composite image will then become $$((\alpha R+(255-\alpha)r)/255, (\alpha G+(255-\alpha)g)/255, (\alpha B+(255-\alpha)b)/255).$$

In one embodiment, the resulting visual effect is a partially transparent first pixel on top of the second pixel. In another embodiment, the alpha-blending process can be extended to additional pixels of the two images super-imposed over each other.

Alpha-blending may be applied to bitmap images or any image represented by pixels or similar discrete elements. A bitmap may also be referred to as a pixmap. Examples of image file formats using bitmap are BMP and MICROSOFT DIB. Many other image file formats, such as TIFF, PNG, JPEG and GIF store bitmap images but may additionally apply compression for efficient storage. Other non-bitmap image file formats may also support alpha-blending. Portions of bitmap images, down to each discrete element, may be characterized by their own distinct $\alpha$ value. Therefore, generally, any bitmap image associated with any object in an object-oriented programming environment may be alpha-blended to another bitmap image.

Figure 1A:
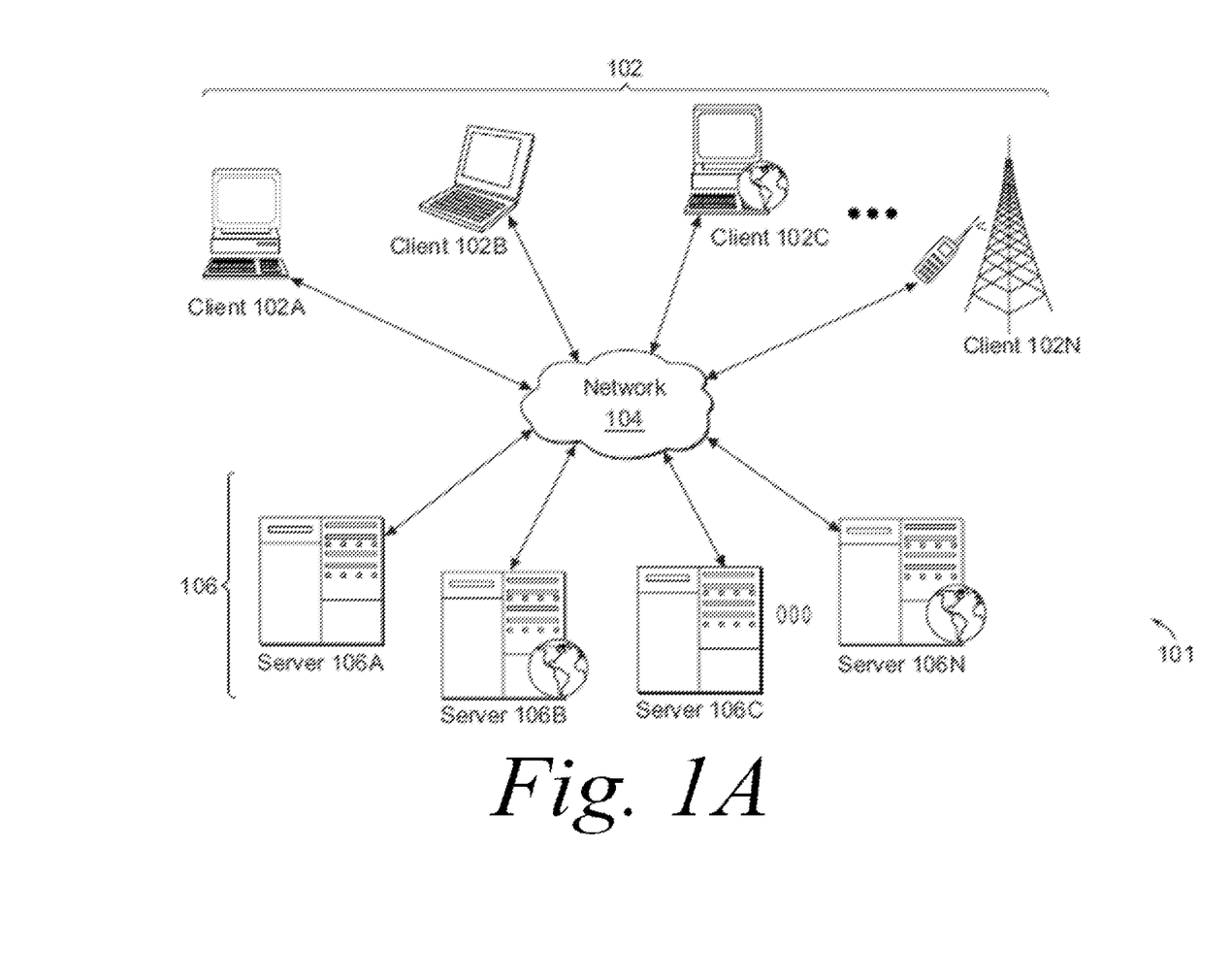
FIG. 1A depicts embodiments of network environments that provide remote access to computing devices that can execute application programs.

FIG. 1A illustrates one embodiment of a computing environment that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106 in some embodiments may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment with an application that is any of either server-based or remote-based, and an application that is executed on the server 106 on behalf of the client machine 102. Further embodiments of the computing environment include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. In some embodiments, the connection between the client 102 and the server 106 can be multiple connections. Although the illustration in FIG. 1A depicts a network 104 connecting the client machines 102 to the servers 106, other embodiments include a computing environment with client machines 102 installed on the same network as the servers 106. Other embodiments can include a computing environment with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
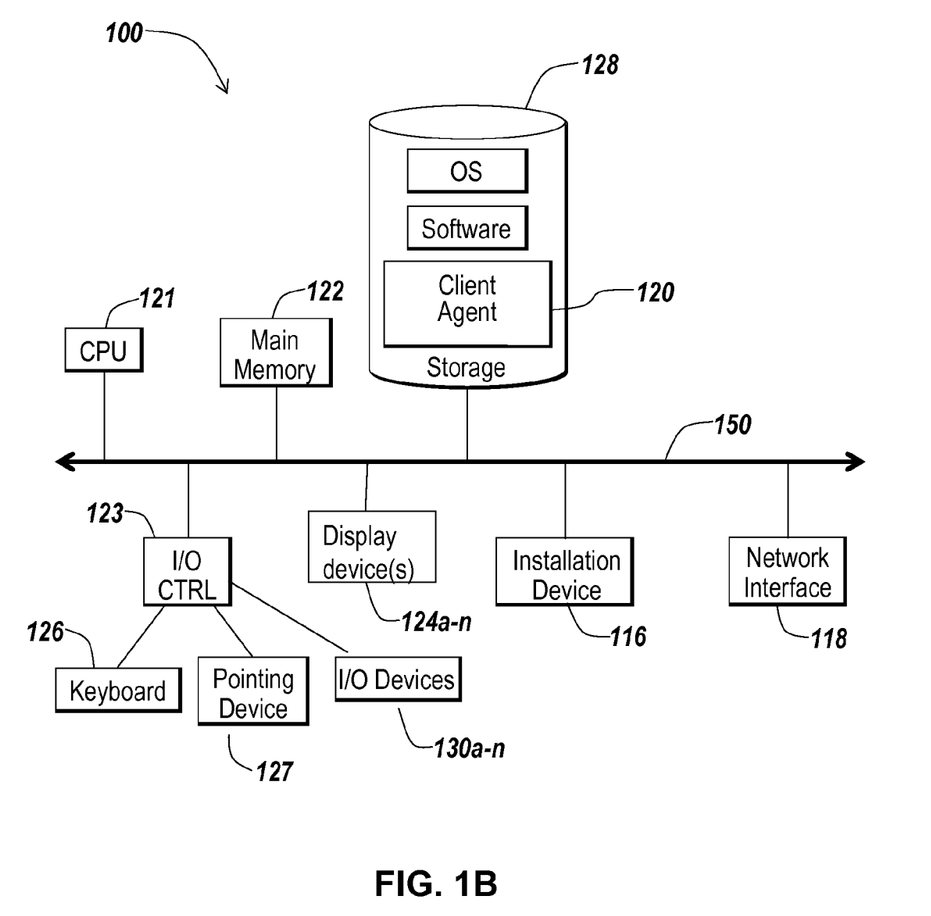
FIG. 1B and FIG. 1C depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
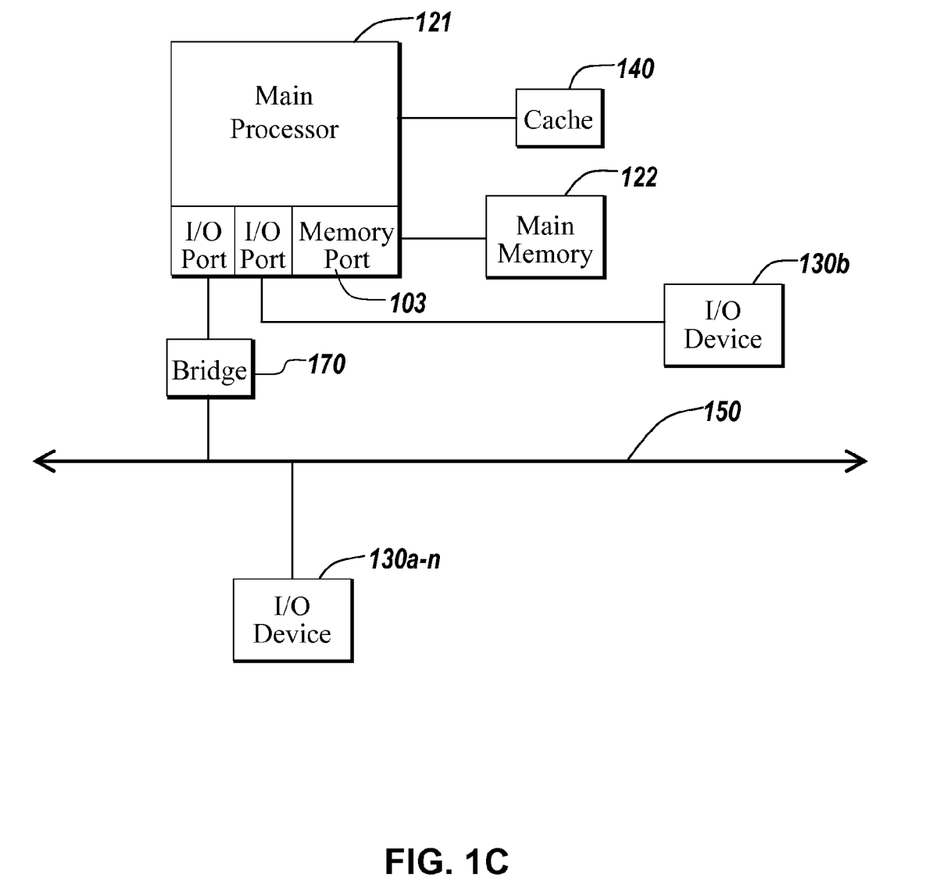

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
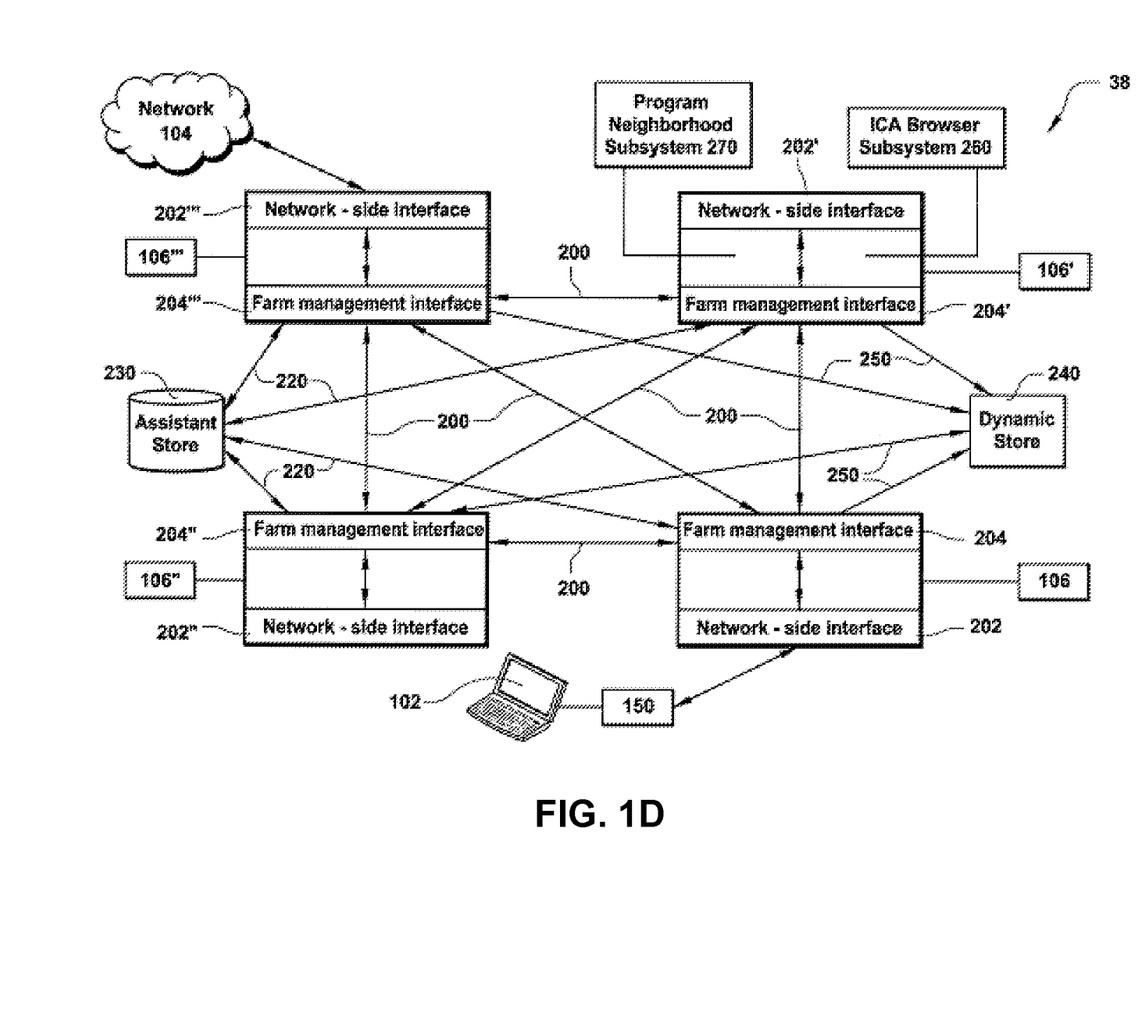
FIG. 1D illustrates a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that does not change frequently, i.e., data that changes only on an hourly, daily, or weekly basis, or data that never changes. Each server uses a persistent storage subsystem to read data from and write data to the persistent store 230.

The data stored by the persistent store 230 may be replicated for reliability purposes either physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 2:
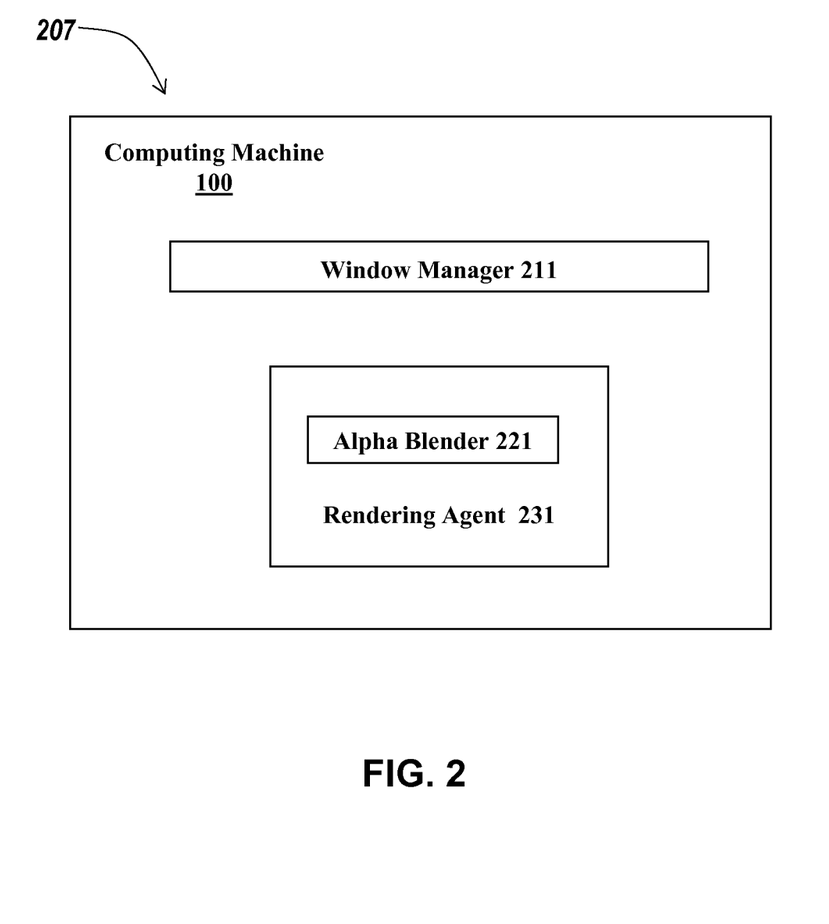
FIG. 2 depicts a block diagram of an embodiment of an alpha blending system.

FIG. 2 is a block diagram that illustrates an embodiment of a system 200 for per-pixel alpha blending of a window image and a portion of a background image. In brief overview, the system 200 can include a computing machine 100, a window manager 211, a rendering agent 231, and an alpha blender 221. The computing machine 100 may be of any type of computing device as described herein. The window manager 211, executing on the computing machine 100, can communicate with the rendering agent 231 which further communicates with the alpha blender 221 and the rendering agent 231 may execute on the same computing machine 100.

Referring now to FIG. 2 in more detail, the computing machine 100 can be any computing machine 100. In some embodiments, the computing machine 100 can be any computing machine 100 described herein. The computing machine 100 can comprise a processor and a memory, and in some embodiments can execute a window manager 211, a rendering agent 231 and an alpha blender 221.

The window manager 211, in some embodiments, controls the placement and appearance of windows within a windowing system in a graphical user interface (GUI.) In one embodiment, the window manager 211 draws the desktop, and communicates with the rendering agent 231, a graphical processing unit (Not Shown) and any other applications or components used to render graphics, windows, text and other objects displayed on the desktop. A window manager 211 can carry out for the user various operations pertaining to windows in a desktop environment, such as opening, closing, minimizing, maximizing, resizing and moving windows. A window manager 211 can also track which windows are running and window decorations in a desktop environment. Window decorations provided by a window manager 211 generally improve the usability of a window desktop environment by providing features such as a title bar for each running window and a minimal border around the window. The border may contain buttons to perform functionality pertaining to the window, such as minimizing, maximizing and closing the window.

Generally, a windowing environment of a computing machine 100 can, in some embodiments, provide functionality for grouping and overlaying objects on a display. A plurality of windows may also overlay each other in a z-ordering system. The overlay portion of at least one object or window can be clipped on the display, when obscured by another object or window "above" it in the z-ordering system. In some embodiments, the window manager 211 can be a stacking window manager that allows windows to overlap by drawing them in a specific order, one at a time. The stacking window manager renders an image of each window directly over the desktop and any other windows that may already have been drawn. Generally, the process usually begins with the desktop and each window and any child windows are drawn from back to front until the foreground window is drawn.

In some embodiments, the window manager 211 can be a tiling window manager that organizes the screen into mutually non-overlapping windows. In other embodiments, the window manager 211 is a hybrid of the different types of window managers described herein.

In still other embodiments, the window manager 211 can be a compositing window manager that draws windows and their borders. A compositing window manager provides that each program outputs to a separate and independent buffer, or other temporary location within the computing device 100. The data in the buffer can then be manipulated prior to being displayed by the computing device 100. The output of the multiple buffers is then processed and combined by the compositing window manager onto a common desktop, resulting in the windows behaving as independent objects and allowing overlapping of the objects. The compositing windows manager, in some embodiments, provides advanced visual effects, such as transparency, fading, scaling, bending, duplicating, contorting, shuffling, and redirecting applications.

A window manager 211, in many embodiments, is a program, application, agent, client or software executing on a computing machine 100. The window manager 211 can mange or monitor window messages, and in some embodiments, can intercept window messages. In still another embodiment, the window manager 211 monitors a message queue that stores a list or array of messages generated by any one of the following: an application executing within a window; a process executing within a window; the operating system in response to actions performed by a user or application; or a graphical data interface.

Windows messages, in some embodiments, are system calls to the operating system. In other embodiments, window messages are generated when a window is moved, resized, created, killed, or otherwise manipulated by a user, an application, another object, or an operating system. In another embodiment, some of the window messages are generated when a user activates an object in the WINDOWS environment, such as clicking on a button with a pointing device. In still another embodiment, some of the window messages are generated when any graphical data on the screen changes. In one embodiment, one of the window messages includes a command to erase graphical data associated with an object. In another embodiment, one of the window messages includes a command to load graphical data associated with an object, for example, to populate a screen region associated with a window with a bitmap image. In other embodiments, one of the window messages can prompt the window manager 211 to take any of the actions described below.

Still referring to FIG. 2, in one embodiment the window manager 211 communicates with an alpha blender 221 executing on the computing machine 100. The alpha blender 221 can execute within a rendering agent 231 or can execute outside of the rendering agent 231 on the computing machine 100. The alpha blender 221 can be a part of the rendering agent 231, yet in other embodiments the alpha blender 221 may execute on a different computing machine than the rendering agent 231. In some embodiments, the alpha blender 221 communicates with the rendering agent 231 such that the alpha blender 221 forwards display data and alpha blended images to the rendering agent 231 for rendering and display. In some embodiments, the alpha blender 221 is implemented in hardware, while in other embodiments the alpha blender 221 is a program, application, client or agent executing on the computing machine 100 by a processor within the computing machine 100. In some embodiments, the alpha blender 221 is implemented using a combination of software and hardware.

The alpha blender 221 communicates with the window manager 211 to obtain the location and size of a window. Using the information received from the window manager 211, the alpha blender 221 generates an image of the window. If the window spans multiple displays, multiple window images are generated for each portion of the window shown on a different display. The alpha blender 221 also generates a background image of the desktop environment displayed beneath the window. In some embodiments, the background image may include only the desktop, including any icons, docks, task bars, program launchers, and wallpaper. In other embodiments, the background image may include the desktop and another window. In still other embodiments, the background image may include the desktop and multiple windows. When multiple displays are used, the alpha blender 221 generates multiple background images, where a background image is generated for each display a portion of the window is shown.

Upon generating images of the window to-be-alpha-blended and the background underneath the window, the alpha blender 221 can use standard alpha blending techniques, such as those discussed above, to blend the window image and the background image. In some embodiments, the window image is sub-divided into multiple portions, and in other embodiments the background image is sub-divided into multiple portions. The portions of the background image, in some embodiments, can correspond to the portions of the window image. The alpha blender 221, in one embodiment, can determine which portions of the window image correspond to the sub-divided portions of the background image and then alpha blends those matching portions together. The size of the portion of the window image and the portion of the background image that are alpha blended together by the alpha blender 221, in some embodiments is a predetermined size that can be designated by an application, a user, an administrator, configuration settings of the alpha blender 221, the alpha blender 221, the rendering agent 231, or the system 200.

The rendering agent 231, in some embodiments, receives the alpha blended image comprised of a portion of the window image and a portion of the background image, and renders a display. In one embodiment, the rendering agent 231 generates display data and forwards the data to window manager 211 which displays the display data on the desktop. In some embodiments, the rendering agent 231 can be an application, program, agent, client or other set of executable instructions executed by the computing machine 100. In other embodiments, the rendering agent 231 can be a hardware device such as a graphical processing unit. In still other embodiments, the rendering agent 231 can be a combination of hardware and executable instructions.

Figure 3:
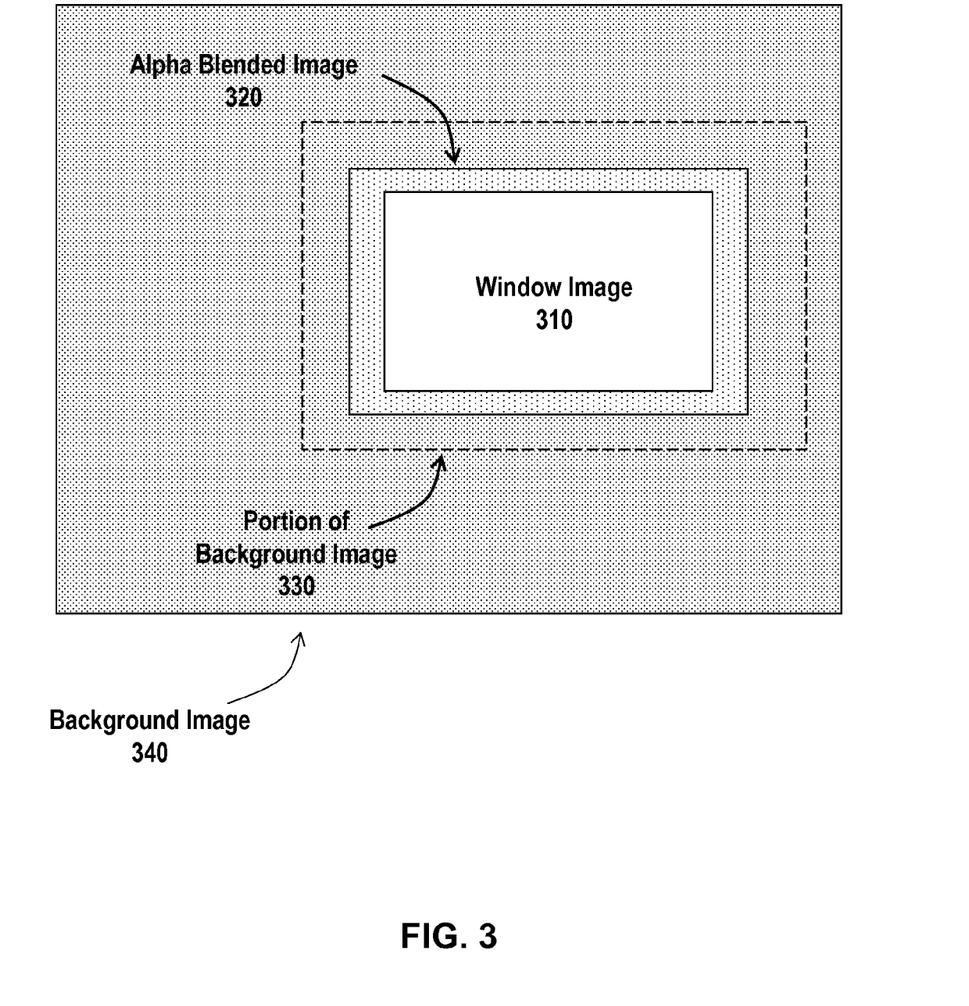
FIG. 3 depicts a block diagram of an embodiment of an alpha blended window.

Referring now to FIG. 3, illustrated is a block diagram that depicts an embodiment of a per-pixel alpha-blending of a window image 310 and a portion of a background image 330. In brief overview, the diagram includes a background image 340 under a window image 310, and the portion of the background image 330 used during to alpha blend. The portion 320 of the window image that is alpha blended to the portion of the background image 330 is also depicted.

In one embodiment, the window manager 211 extracts at least a portion of the background image 330 from the background image 340 stored in a storage component 128 of the computing machine 100. Extraction of the portion of the background image 330 can include generating a snapshot of the background, and selecting a portion of the resulting image. A snapshot, in some embodiments, can be a picture, image capture or screen shot of a display, background or desktop. The resulting image, in some embodiments, can comprise a graphical representation of the objects displayed on the desktop. These objects can include: a window; a desktop; a mouse pointer; or any other object or window displayed on the desktop. In some embodiments, the window manager 211 can extract a portion of the background image, while in other embodiments the alpha blender 221 can extract a portion of the background image. The background image can be in any image format such as JPEG, GIF, TIFF or BMP.

The window manager 211, in some embodiments, can receive a portion of the background image 330 from a frame buffer containing the background image 340. In still another embodiment, the window manager 211 extracts the portion of the background image 330 by removing graphical data associated with the window image 310 to temporarily expose the desktop graphical data in the identified screen region and then captures the desktop graphical data in the identified screen region. In still even another embodiment, the capturing mechanism leverages a "Print Screen" handler provided in a WINDOWS environment to capture an image of the background.

The window manager 211, in some embodiments, stretches the plurality of bitmap images according to the size of the window image 310. In another embodiment, the stretching of the plurality of bitmap images is a manual process. In still another embodiment, the window manager 211 generates a window image 310 from the plurality of bitmap images. In still another embodiment, the window manager 211 generates a third image comprising the second image 310 alpha-blended with the first image 330. In yet another embodiment, the window manager 211 performs at least one of the functions described above through at least one application programming interface (API) provided by an operating system or an application.

In one embodiment, the background image 340 may span the entire screen display, or may be a desktop wallpaper or a tiled image. In still other embodiments, the background image 340 can span an entire display, which in some embodiments can include one or more display screens, e.g. a dual, triple or quadruple screen display. In some embodiments, the desktop image 340 can be an expanded version of an image file provided by an operating system, an application, or a user. In some of these embodiments, some of the imported images may be vector images represented by mathematical description rather than bitmaps. In one embodiment, the imported image or images forming the desktop image 340 may be stored as separate files. In another embodiment, the imported image or images forming the desktop may be stored in their own native image file formats. In still another embodiment, the desktop image 340 is not a single bitmap image but assembled on screen using the imported images.

Figure 4:
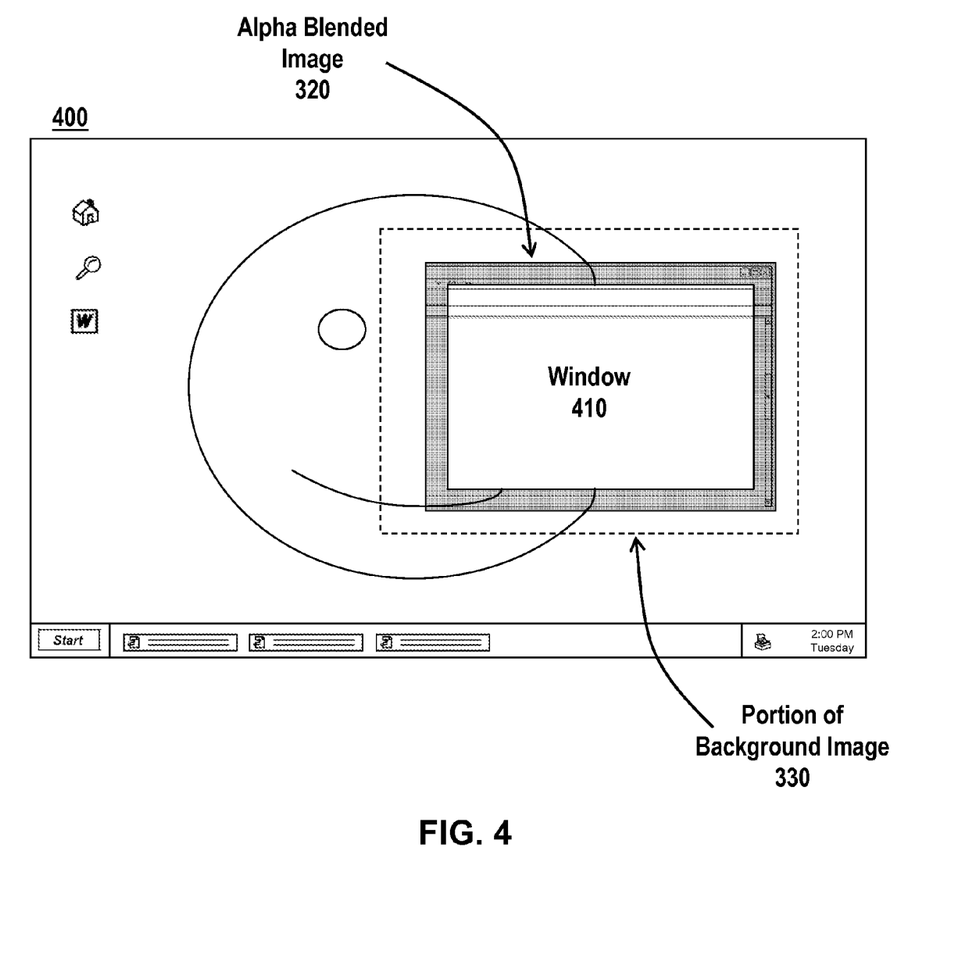
FIG. 4 depicts a block diagram of an embodiment of an alpha blended window.

Referring now to FIG. 4, a diagram illustrates an embodiment of the per-pixel alpha blending system. In brief overview, the illustration includes a desktop environment 400 executing on a computing machine 100. The desktop environment 400 includes various desktop icons and a desktop wallpaper. A window image 310 is generated by the alpha blender 221 capturing the window 410 and an image of a portion of the background 320 is generated by capturing the desktop environment 400. The alpha blender 221 alpha blends the images and a resulting alpha blended image 320 is generated. The resulting alpha blended image 320 is rendered to the display by the rendering agent 231 described herein.

Included in the background image generated by either the window manager 211 or the alpha blender 221, are the images displayed on the desktop. Thus, when the alpha blender alpha blends the portion of the background image to an image of the window 410, what results is the alpha blended image 320. Alpha blending can enhance the transparency of certain aspects of an image. Thus, when at least a portion of the image of the window 410 is alpha blended with the background image 330, what may result is a semi-transparent image 320 that comprises shading and/or smooth, rounded corners. This image 320 can be displayed within the window to mask the sharp contrast between the window edge and the desktop.

Figure 5:
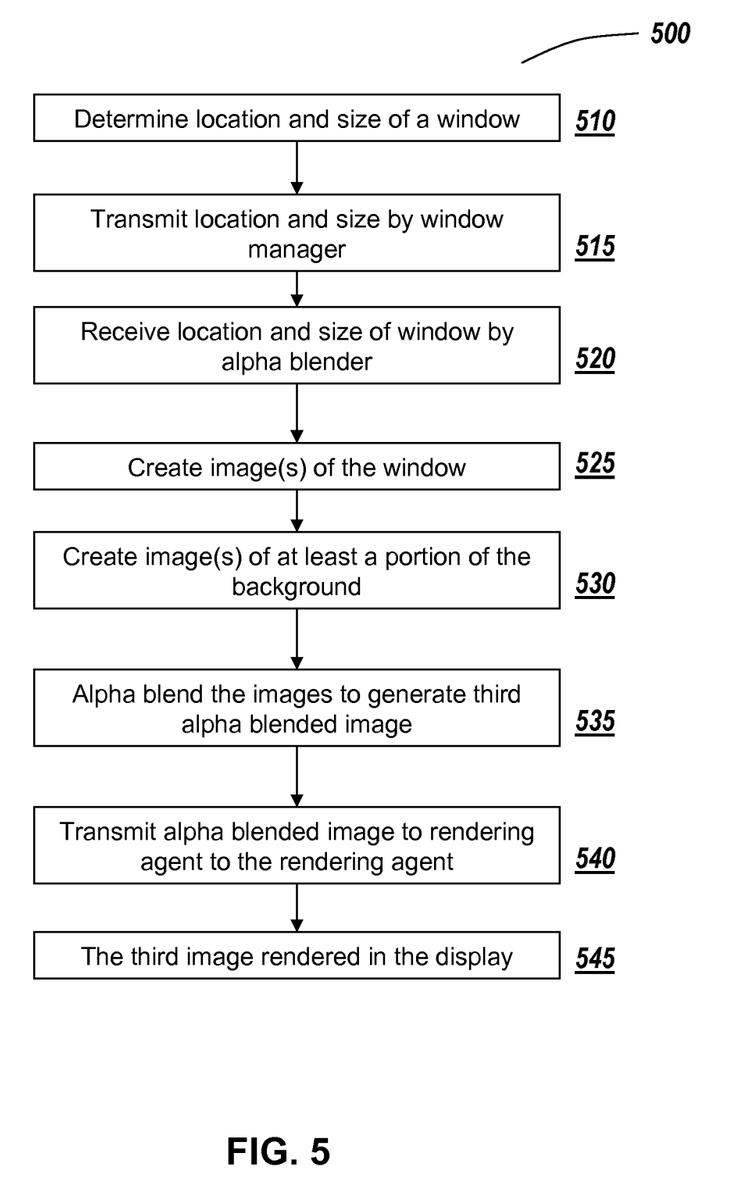
FIG. 5 illustrates a flow chart of an embodiment for alpha blending a parent window to a background image.

Illustrated in FIG. 5 is an embodiment of a method 500 for per-pixel alpha blending. The method 500 includes first determining the location and size of a window (Step 510). Then, once the location and size of a window are determined, the information is transmitted (Step 515). The alpha blender receives the location and size of the window (Step 520) and uses the information to create an image or images of the window (Step 525). Once the creation of the window image 310 is complete, an image of at least a portion of the background 330 is also created (Step 530). The images are alpha-blended to generate a third alpha-blended image 320 (Step 535). Then, the alpha-blended image 320 is transmitted to the rendering agent (Step 540), that then renders the third image 320 to a display (Step 545).

In one embodiment, alpha-blending of a pixel painted in the background area to the desktop is triggered, for example, by a movement of the window on the screen. In another embodiment, the movement may generate at least one window message received by the window manager 211. In still another embodiment, responsive to the at least one window message received, the window image 310 described above is generated. In still even another embodiment, the window manager 211 also generates a second image 340, representing desktop graphical data associated with the screen region 400. In yet another embodiment, the window manager 211 then instructs the graphics card to alpha-blend the first image 310 with the second image 340 to generate a third image 320 and to display the third image 320. When alpha-blending occurs, images may be alpha blended according to the methods described in FIG. 5.

Further referring to FIG. 5, and in more detail, the window manager 211 can first determine the location and size of a window displayed on a desktop (Step 510). In some embodiments, the location and size of a window can be determined by obtaining the x-coordinates and y-coordinates of the origin of the window and the length of the sides of the window. The origin of the window, in some embodiments, can be defined by the operating system as the upper left corner of the window. In other embodiments, the operating system can define the origin as the lower left corner of the window, the center of the window, or any other location within the window. The length of the sides of the windows are obtained as x-coordinates and y-coordinates and using these measurements together with the origin of the window, the window manager 211 can calculate the size and location of the window. In some embodiments, the window manager 211 can receive a message from the operating system that includes the location and size of the window. In this embodiment, the window manager 211 would no longer need to calculate the size and position of the window.

In another embodiment, the window manager 211 determines the location and size of the window by obtaining the x-coordinates and y-coordinates of the points representing the two opposing corners in a window, such as the upper-left corner and lower-right corner or upper-right corner and lower-left corner of the window. The window manager 211 can then calculate the location and size of the window using the obtained coordinates. In still another embodiment, the window manager 211 determines the location and size of the window by obtaining four values: minimum X value, minimum Y value, maximum X value, and maximum Y value. The minimum X value is the value representing the smaller x-coordinate value of the window while the maximum X value is the value representing the greater x-coordinate value of the window. The minimum Y value is the value representing the smaller y-coordinate value of the window while the maximum Y value is the value representing the greater y-coordinate value of the window. The window manager 211 can use the obtained values to determine the size and location of the window.

In embodiments where a window spans multiple displays, desktops or display devices, the window manager 211 determines the size of the portion of the window shown on each display and obtains the size and location of the portion of the window for that display. Upon making these determinations, the window manager 211 can determine an overall window size and location relative to each display.

Upon obtaining both the size and location of the window, the window manger 211 can then transmit this information (Step 515) to the alpha blender 221. In some embodiments, the window manager 211 can transmit the window size and the window location in response to a request issued by the alpha blender 221. This request or message may instruct the window manager 211 to send the alpha blender 221a message containing the size and location of the window. In yet another embodiment, the window manager 211 can store the window size and location information in a storage repository on the computing machine 100. Thus, when the alpha blender 221 requires the window location and size information, the alpha blender 221 can retrieve such information from the storage repository.

Once the alpha blender 221 either receives the location and size of the window (Step 520) or retrieves this information from memory or a storage repository, the alpha blender 221 can generate or create one or more images of the window (Step 525). In one embodiment, the alpha blender 221 can generate a snapshot of the entire desktop including the window. Upon generating the desktop snapshot, the alpha blender 221 can then use the window's size and location to crop the snapshot so that what remains is an image of the window. In another embodiment, the alpha blender 221 can intercept draw commands issued to a desktop renderer and, using coordinates associated with at least a portion of the draw commands, the alpha blender 221 can group or temporarily store draw commands for the portion of the screen corresponding to the location of the window. Upon selecting these particular draw commands, the alpha blender 221 can send the draw commands to a rendering agent so that the rendering agent can generate an image of the window using the draw commands. In some embodiments, the alpha blender 221 can create a single image of the window. In other embodiments, the alpha blender 221 can create multiple images that when combined, form an aggregate image of the entire window. In embodiments where the window spans multiple displays, the alpha blender 221 can generate at least an image for each portion of the window visible in each display. For example, if the window spans two displays, a first image of the window is created for the portion of the window displayed in the first display, and a second image of the window is created for the portion of the window displayed in the second display.

Once the alpha blender 221 completes generating images representative of the window, the alpha blender then proceeds to create a background image 330 (Step 530) of the background behind the window. As stated previously, this background can include a desktop, another window, or other objects. In one embodiment, the alpha blender 221 can use any of the above-described methods to generate an image of the background. These methods can include generating a snapshot of the entire desktop and cropping the image to generate an image of the background immediately behind the window; generating a snapshot of just the background immediately behind the window; intercepting the draw commands for each element displayed in the background and permitting a rendering agent to render only those commands corresponding to an area of the background immediately behind the window. The area or image immediately behind the window can be some area surrounding the window by a predetermined amount. For example, the background area may comprise a border extending approximately 100 pixels from the edge of the window, or the background area may be the same shape as the window but may have dimensions that are 20% larger than the window. In still other embodiments, the alpha blender 221 may select a random sized area behind the window. In at least one embodiment, the alpha blender 221 creates a single image of the background, and crops the single image to generate an image of only a portion of the background. In embodiments where the window spans multiple displays, the alpha blender 221 can generate at least one image for the portion of the window visible in each display.

Upon generating the background image, the alpha blender 221 can then blend the image of the window with the background image to generate a third image 320 (Step 535). The alpha blender 221 can use any alpha blending methods or algorithms to blend the two images. In some embodiments, the alpha blender 221 can use any of the alpha blending methods described herein.

The alpha blender 221 then transmits the third image to the rendering agent 231 for rendering (Step 540), and the rendered third image is displayed in the window (Step 545). In some embodiments, the third image is displayed such that it masks the edge of the drawn window. This can be accomplished by constructing a window that includes an image or graphic placed within the window such that when the window is displayed, the image is rendered to the display rather than the true window edge. In effect, the third alpha blended image 320 can be used to replace at least a portion of the displayed window. This third image 320 may comprise a smoother, anti-aliased image that gives the window edges the appearance of a rounded edge. In one embodiments of the method 500, the third image 320 can be an edge of a window. In other embodiments, the third image 320 can be a button displayed within the window. In still other embodiments, the third image 320 can comprise a single pixel, while in other embodiments the third image 320 can comprise a group of pixels. A group of pixels, in some embodiments, can include pixels adjacent to one another and pixels that are not adjacent to one another.

In one embodiment, the method 500 can further include a window manager 211 or alpha blender 221 that can identify a first pixel in the window image. In some embodiments, this first pixel can be a first alpha channel value. An alpha channel value, in some embodiments, is a value that represents the color of a particular pixel in an image. In one embodiment, an alpha channel value is also used to represent the transparency or opacity of a particular pixel. For example, a pixel having an alpha channel value of (0.0, 0.5, 0.0, 1) is a green pixel that is fully opaque. In this channel value, the first three values, i.e. 0.0, 0.5, 0.0, identifies the RGB (Red Green Blue) values of the pixel which in this alpha channel value, represents the color green. The last value, i.e. 1, represents the opacity or transparency of the pixel. A value of 0 is a fully transparent pixel, while a value of 1 is a fully opaque pixel. The window manager 211 or alpha blender 221 can then identify a second pixel in a section of the background image and determine the second alpha channel value for that second pixel. Thus, the alpha channel value, in some embodiments, is a numeric value or group of numeric values that identifies both the color of a pixel and the opacity or transparency of the pixel. The alpha blender 221 can use multiple alpha channel values to determine which color pixel to display and whether the transparency or opacity level of that pixel.

In one embodiment, once both the first and second alpha channel values have been determined, a third alpha channel value is calculated using the first and second alpha channel values. In one embodiment, the third alpha channel value is calculated using any type of alpha blending algorithm. In another embodiment, the third alpha channel value is calculated using the alpha blending algorithm(s) described herein. The third alpha channel value, in some embodiments, is used in the third image 320 in lieu of the first alpha channel value or the second alpha channel value.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the present disclosure has described multiple embodiments of systems and methods for launching an application into an existing isolation environment, it should be understood by those skilled in the art that various changes in form and detail may be made therein without departing from the spirit and scope of the invention as defined by the following claims.

What is claimed is:

1. A method for alpha-blending sections of a window with sections of a background region, the method comprising:
    obtaining, by a window manager executing on a computing machine, coordinates of a window located over a background region;
    capturing, by an alpha-blender executing on the computing machine, an image of the background region at least partially overlapped by the window;
    alpha-blending, by the alpha-blender, an image of the window with a section of the background region image to generate a third image by at least:
        determining that a first pixel in the window image comprises a first alpha channel value;
        determining that a second pixel in the section of the background image comprises a second alpha channel value, the first alpha channel value different than the second alpha channel value;
        calculating a third alpha channel value using the first alpha channel value and the second alpha channel value; and
        including the third alpha channel value in the generated third image; and
    displaying, by a rendering agent executing on the computing machine, the third image within the window.

2. The method of claim 1, wherein capturing the background region image further comprises capturing an image of the background region having a size derived from the obtained window coordinates.

3. The method of claim 1, wherein capturing the background region image further comprises capturing an image of the background region where the window wholly overlaps the background region image.

4. The method of claim 1, further comprising capturing, by the alpha-blender, an image of the window.

5. The method of claim 1, wherein capturing the image of the background region further comprises capturing the image of the background region comprising a desktop.

6. The method of claim 1, wherein capturing the image of the background region further comprises capturing an image of the background region comprising at least a second window.

7. The method of claim 1, wherein capturing the background region image further comprises capturing an image of the background region, the background region image having a size and a location determined using the obtained window coordinates.

8. The method of claim 1, wherein alpha-blending an image of the window further comprises alpha-blending an image of a portion of the window.

9. The method of claim 1, wherein displaying the third image further comprises displaying the third image within a background of the window.

10. A system for alpha-blending sections of a window with sections of a background region, the system comprising:
    a computing machine comprising a processor and memory;
    a window manager executing on a computing machine to obtain coordinates of a window located over a background region;
    an alpha-blender executing on the computing machine to capture an image of the background region at least partially overlapped by the window,
    and alpha-blend an image of the window with a section of the background region image to generate a third image, wherein the alpha-blender:
        determines that a first pixel in the window image comprises a first alpha channel value;
        determines that a second pixel in the section of the background image comprises a second alpha channel value, the first alpha channel value different than the second alpha channel value;
        calculates a third alpha channel value using the first alpha channel value and the second alpha channel value; and
        includes the third alpha channel value in the generated third image; and
    a rendering agent executing on the computing machine to display the third image within the window.

11. The system of claim 10, wherein the alpha-blender captures an image of the background region having a size derived from the obtained window coordinates.

12. The system of claim 10, wherein the alpha-blender captures an image of the background region where the window wholly overlaps the background region image.

13. The system of claim 10, wherein the alpha-blender captures an image of the window.

14. The system of claim 10, wherein the alpha-blender captures an image of the background region comprising a desktop.

15. The system of claim 10, wherein the alpha-blender captures an image of the background region comprising at least a second window.

16. The system of claim 10, wherein the background region image has a size and a location determined using the obtained window coordinates.

17. The system of claim 10, wherein the alpha-blender alpha-blends an image of a portion of the window.

18. The system of claim 10, wherein the rendering agent displays the third image within a background of the window.

* * * * *